United States Patent
Aston et al.

(10) Patent No.: US 10,494,123 B2
(45) Date of Patent: *Dec. 3, 2019

(54) SYSTEMS FOR INTERCONNECTING DUAL MANIFESTED SPACECRAFT

(71) Applicant: The Boeing Company, Chicago, IL (US)

(72) Inventors: Richard William Aston, Brea, CA (US); Michael J. Langmack, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,999

(22) Filed: Aug. 16, 2017

(65) Prior Publication Data
US 2017/0369193 A1    Dec. 28, 2017

Related U.S. Application Data

(60) Division of application No. 14/331,029, filed on Jul. 14, 2014, now Pat. No. 9,809,329, which is a continuation of application No. 13/490,945, filed on Jun. 7, 2012, now Pat. No. 8,807,485.

(51) Int. Cl.
*B64G 1/64* (2006.01)
*B64G 1/10* (2006.01)

(52) U.S. Cl.
CPC .......... *B64G 1/641* (2013.01); *B64G 1/1085* (2013.01); *B64G 1/645* (2013.01); *B64G 2001/643* (2013.01)

(58) Field of Classification Search
CPC .......... B64G 1/64; B64G 1/641; B64G 1/645; B64G 1/646; B64G 2001/643
See application file for complete search history.

(56) References Cited

U.S. PATENT DOCUMENTS

| | | |
|---|---|---|
| 2,489,984 A | 11/1949 | Shoemaker |
| 3,420,470 A | 1/1969 | Meyer |
| 3,981,467 A | 9/1976 | Ludlow |
| 4,219,171 A | 8/1980 | Rudmann |
| 4,554,905 A * | 11/1985 | Smyly ...................... B64G 1/14 124/56 |
| 4,682,804 A | 7/1987 | Palmer et al. |
| 4,854,526 A | 8/1989 | Rochefort |

(Continued)

FOREIGN PATENT DOCUMENTS

GB    2200877    8/1988

OTHER PUBLICATIONS

European Patent Office, Extended European Search report for related European Application No. 13170866, dated Nov. 15, 2017.

*Primary Examiner* — Jessica B Wong
(74) *Attorney, Agent, or Firm* — Dascenzo Intellectual Property Law, P.C.

(57) ABSTRACT

Systems and methods for interconnecting dual manifested spacecraft for launch by a launch vehicle are disclosed. Different motive forces are utilized to couple a first spacecraft to a second spacecraft and to restrict demating of the second spacecraft from the first spacecraft. Some systems and methods utilize pneumatic pressure to permit mating of a first spacecraft to a second spacecraft and utilize spring force to restrict demating of the second spacecraft from the first spacecraft.

16 Claims, 5 Drawing Sheets

(56) References Cited

U.S. PATENT DOCUMENTS

| | | | |
|---|---|---|---|
| 5,108,049 | A | 4/1992 | Zinovi |
| 5,271,286 | A | 12/1993 | Vranish |
| 5,411,226 | A | 5/1995 | Jones et al. |
| 5,884,866 | A | 3/1999 | Steinmeyer et al. |
| 6,227,493 | B1 | 5/2001 | Holemans |
| 6,708,928 | B2 | 3/2004 | Telford |
| 7,370,835 | B2 | 5/2008 | Kistler et al. |
| 7,780,119 | B2 | 8/2010 | Johnson et al. |
| 7,992,824 | B2 | 8/2011 | Tchoryk et al. |
| 8,807,485 | B2 * | 8/2014 | Aston .............. B64G 1/641 244/173.3 |
| 9,809,329 | B2 * | 11/2017 | Aston .............. B64G 1/641 |
| 2006/0145016 | A1 | 7/2006 | Renfro |
| 2007/0210212 | A1 | 11/2007 | Tchoryk et al. |
| 2008/0290222 | A1 | 11/2008 | Aston et al. |
| 2011/0058892 | A1 | 3/2011 | Tchoryk, Jr. et al. |
| 2012/0012711 | A1 | 1/2012 | Ross et al. |

* cited by examiner

SYSTEMS FOR INTERCONNECTING DUAL MANIFESTED SPACECRAFT

RELATED APPLICATIONS

The present application is a divisional of and claims priority to U.S. patent application Ser. No. 14/331,029, filed on Jul. 14, 2014 and entitled "SYSTEMS FOR INTERCONNECTING DUAL MANIFESTED SPACECRAFT," which is a continuation of and claims priority to U.S. patent application Ser. No. 13/490,945, filed on Jun. 7, 2012, entitled "SYSTEMS FOR INTERCONNECTING DUAL MANIFESTED SPACECRAFT," which issued as U.S. Pat. No. 8,807,485 on Aug. 19, 2014, the complete disclosures of which are incorporated herein by reference.

FIELD

The present disclosure relates to dual manifested spacecraft.

BACKGROUND

The costs associated with placing spacecraft (e.g., satellites) in orbit are astronomical. For example, in 2012, typical launch costs may be approximately US$20,000 per kilogram of mass, which includes the mass of the launch vehicle and fuel, as well as the mass of the spacecraft being placed in orbit by the launch vehicle. In an effort to reduce the overall mass and thus to reduce launch costs, more than one spacecraft may be positioned within a single launch vehicle. When two spacecraft are coupled together for a single launch, the spacecraft may be referred to as dual manifested spacecraft. Because of the forces involved and the delicacy of the spacecraft, the interconnection between two dual manifested spacecraft must be secure.

SUMMARY

Systems and methods for interconnecting dual manifested spacecraft for launch by a launch vehicle are disclosed. Different motive forces are utilized to couple a first spacecraft to a second spacecraft and to restrict demating of the second spacecraft from the first spacecraft. Some systems and methods utilize pneumatic pressure to permit mating of a first spacecraft to a second spacecraft and utilize spring force to restrict demating of the second spacecraft from the first spacecraft. In some systems, a coupling mechanism includes a plurality of pins that are selectively translated into aligned bores that are defined by a first spacecraft and a second spacecraft. In some such systems, the pins are configured to bear a vertical load associated with the second spacecraft but not a significant lateral load associated with lateral movement of the second spacecraft relative to the first spacecraft. In some such systems the pins are keyed to restrict their rotation relative to an associated housing.

DESCRIPTION

Systems and methods for interconnecting dual manifested spacecraft for launch by a launch vehicle are disclosed. As used herein, "dual manifested spacecraft" refers to at least two spacecraft that are operatively coupled and secured together for launch into outer space. The drawings and discussions herein reference two spacecraft; however, it is within the scope of the present disclosure that more than two spacecraft may be coupled and secured together for launch into outer space. Also within the scope of the present disclosure are spacecraft and launch vehicles, themselves, as associated with the systems and methods for interconnecting dual manifested spacecraft.

Figure 1:
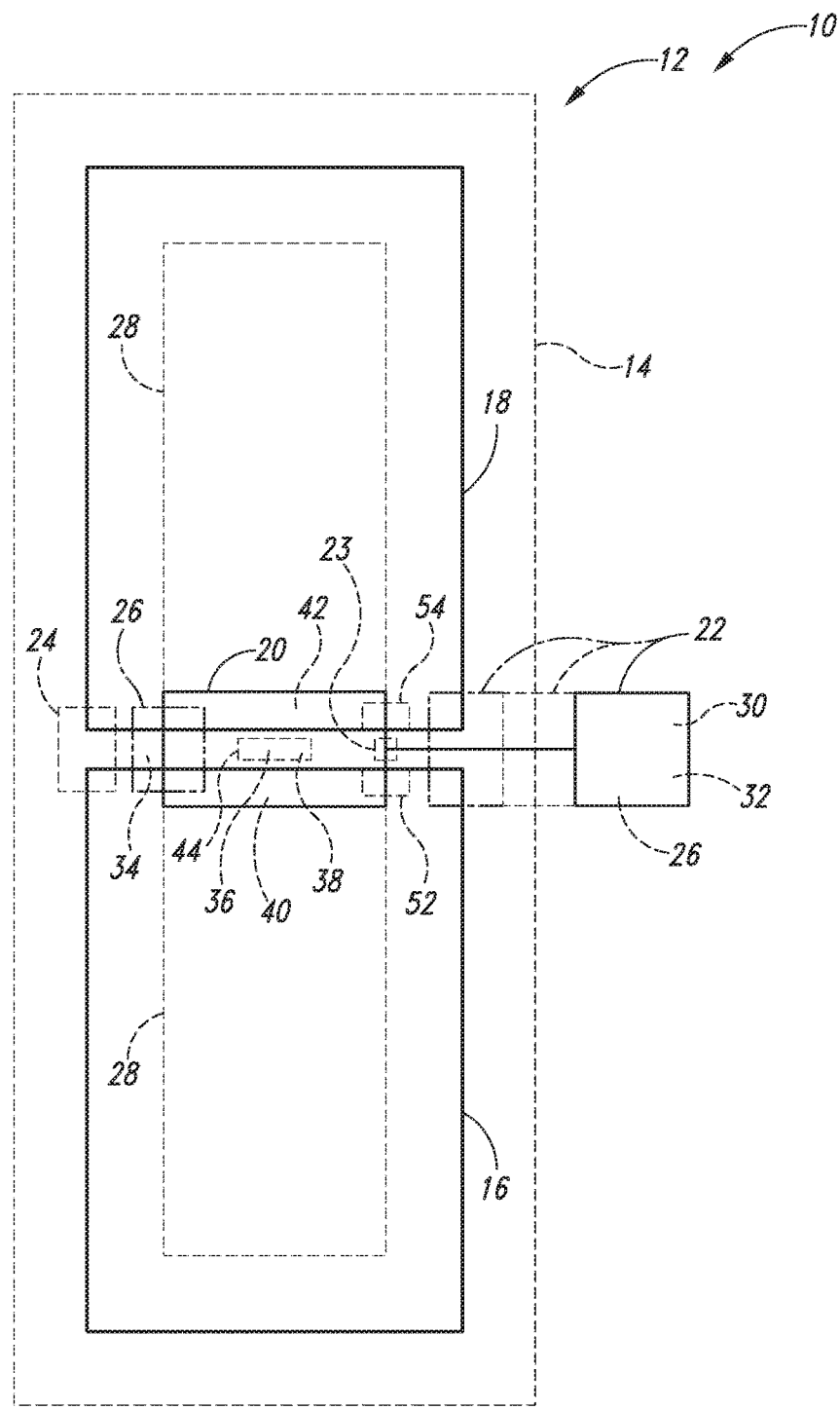
FIG. 1 is a schematic diagram representing dual manifested spacecraft, systems for interconnecting dual manifested spacecraft, and launch vehicles for dual manifested spacecraft.

FIG. 1 schematically illustrates systems 10 for interconnecting dual manifested spacecraft 12. In FIG. 1, a launch vehicle 14 is schematically illustrated as housing a first spacecraft 16 and a second spacecraft 18 in a vertical orientation, such as may be appropriate for initial launch of the launch vehicle 14 with the first spacecraft 16 and second spacecraft 18 into orbit; however, the use of "first" and "second" as well as the illustrated orientation of relative components herein do not limit the scope of the present disclosure and instead are used to facilitate discussion with reference to the drawings.

Systems 10 include a coupling mechanism 20 that is operatively coupled to the first spacecraft 16 and that is configured to selectively and securely couple the first spacecraft 16 to the second spacecraft 18. Coupling mechanism 20 is illustrated in FIG. 1 in an overlapping relationship with the first spacecraft 16 and the second spacecraft 18, schematically representing that the coupling mechanism 20 may be engaged with both of the first spacecraft 16 and the second spacecraft 18 when the first spacecraft 16 and the second spacecraft 18 are operatively coupled and secured together. Additionally or alternatively, the first spacecraft 16 may include the coupling mechanism 20. Additionally or alternatively, portions of the first spacecraft 16 and the second spacecraft 18 collectively may define the coupling mechanism 20. Additionally or alternatively, the coupling mechanism 20 may be a separate component that is selectively coupled to the first spacecraft 16 and/or the second spacecraft 18 prior to interconnecting, or manifesting, the two spacecraft 12 together for positioning in the launch vehicle 14. The coupling mechanism 20 additionally or alternatively may be described as or referred to as a coupling assembly 20, an interconnector 20, an interconnector assembly 20, a spacecraft mating mechanism or assembly 20, or any other suitable name that describes the functionality of the coupling mechanism 20.

The coupling mechanism 20 has an uncoupled configuration, in which the coupling mechanism 20 permits the second spacecraft 18 to become operatively mated with the first spacecraft 16, and a coupled configuration, in which the coupling mechanism 20 restricts the second spacecraft 18 from being demated, or uncoupled, from the first spacecraft 16. The uncoupled configuration additionally or alternatively may be described as an uncoupled position, and the coupled configuration additionally or alternatively may be described as a coupled position. Moreover, the coupled configuration and the uncoupled configuration refer to the configuration or position of the coupling mechanism 20, itself, and not necessarily to the configuration or condition of the associated spacecraft 12, and whether or not the first spacecraft 16 and the second spacecraft 18 are mated. For example, the coupling mechanism 20 may be in the coupled configuration, in which the coupling mechanism 20 is configured to restrict the demating of two spacecraft 12 if the two spacecraft 12 were presently mated, even if the second spacecraft 18 is not presently mated with the first spacecraft 16. In other words, the respective configurations of the coupling mechanism 20 refer to the coupling mechanism 20 itself and not necessarily to a present condition of two spacecraft 12.

Systems 10 also include a trigger mechanism 22 that is configured to selectively reconfigure, or to permit selective reconfiguration of, the coupling mechanism 20 from the coupled configuration to the uncoupled configuration to permit mating of the second spacecraft 18 to the first spacecraft 16. The trigger mechanism 22 additionally or alternatively may be described as or referred to as an activation mechanism 22 or any other suitable name that describes the functionality of the trigger mechanism 22. The trigger mechanism 22 is so termed, because it is configured to actively cause, or trigger, the transition of the coupling mechanism 20 from its coupled configuration to its uncoupled configuration in response to some user input when desired by the user, such as when the second spacecraft 18 is to be mated with the first spacecraft 16.

In some embodiments, the coupling mechanism 20 is biased to its coupled configuration, and therefore, prior to being reconfigured by the trigger mechanism 22 from the coupled configuration to the uncoupled configuration, the coupling mechanism 20 may not permit operative mating of the second spacecraft 18 to the first spacecraft 16. In other words, prior to two spacecraft 12 being mated and when the coupling mechanism 20 is in its biased position (i.e., the coupled configuration), portions or aspects of the coupling mechanism 20 may prevent the second spacecraft 18 from being appropriately positioned relative to and operatively mated with the first spacecraft 16, as will be further understood with reference to illustrative, non-exclusive embodiments disclosed herein. Accordingly, the trigger mechanism 22 is utilized to operate against the bias of the coupling mechanism 20 for selective configuration of the coupling mechanism 20 to its uncoupled configuration so that the second spacecraft 18 may be appropriately positioned and operatively mated with the first spacecraft 16. By being "biased" to, or toward, its coupled configuration, it is meant that without the triggering mechanism 22 or some other structure operatively causing the coupling mechanism 20 to be in its uncoupled configuration, the coupling mechanism 20 automatically is in its coupled configuration. Stated differently, the default configuration or position of the coupling mechanism 20 is the coupled configuration, and some external or separate force, such as from the trigger mechanism 22, is required to reconfigure the coupling mechanism 20 from its coupled configuration to its uncoupled configuration. As an illustrative, non-exclusive example, the coupling mechanism 20 may be spring-biased to its coupled configuration.

In some embodiments, systems 10 may be configured to permit reconfiguring of the coupling mechanism 20 from the coupled configuration to the uncoupled configuration only when the launch vehicle 14 is on earth and not after launch of the launch vehicle 14.

In FIG. 1, the trigger mechanism 22 is schematically illustrated in solid lines outside of the launch vehicle 14, but with the trigger mechanism 22 being operatively and at least temporarily coupled to the coupling mechanism 20. This schematically represents that in some embodiments, the trigger mechanism 22, or at least one or more components of the trigger mechanism 22, may be separate and apart from the launch vehicle 14, the first spacecraft 16, the second spacecraft 18, and the coupling mechanism 20. In such embodiments, the trigger mechanism 22 remains on earth upon launch of the launch vehicle 14 and the dual manifested spacecraft 12. Additionally or alternatively, the trigger mechanism 22 may be configured to be selectively and operatively coupled to and decoupled from the coupling mechanism 20, for example, via any suitable mechanism 23 such as a quick-release fitting, only when the launch vehicle 14 is on earth and not after launch of the launch vehicle 14. Such embodiments may be described as having ground-based trigger mechanisms 22 and may facilitate a total mass associated with the launch of dual manifested spacecraft 12 that is less than would otherwise be possible if the trigger mechanism 22 (or other component of a prior art system that facilitates mating and demating of dual manifested spacecraft) were required to remain within or coupled to a launch vehicle 14 upon launch. As illustrative, non-exclusive examples, the coupling mechanism 20 of a system 10 may have a mass that is less than 30, 25, 20, 15, 10, and/or 5 kilograms.

In some such embodiments in which the trigger mechanism 22 remains on earth, a separate demating mechanism 24 may be provided to facilitate demating of the dual manifested spacecraft 12 after launch of the launch vehicle 14 and once the spacecraft 12 are in orbit. In FIG. 1, the optional demating mechanism 24 is schematically illustrated in an overlapping relationship with the first spacecraft 16 and the second spacecraft 18 and spaced apart from the coupling mechanism 20, representing that the demating mechanism 24 may be separate and distinct from the coupling mechanism 20, yet still be configured to demate the second spacecraft 18 from the first spacecraft 16 even though the coupling mechanism 20 may still be in its coupled configuration. An illustrative, non-exclusive example of a demating mechanism 24 includes a pyrotechnic system that is configured to separate the first spacecraft 16 and the second spacecraft 18 at a desired moment in time when the spacecraft 12 are in orbit.

As schematically illustrated in dashed lines in FIG. 1 with the trigger mechanism 22 in an overlapping relationship with the launch vehicle 14, in some embodiments of systems 10, the trigger mechanism 22 may be at least partially coupled to the launch vehicle 14 and/or include components that are coupled to the launch vehicle 14. Additionally or alternatively, the launch vehicle 14 may include components of the trigger mechanism 22. Additionally or alternatively, as schematically illustrated in dash-dot lines in FIG. 1 with the trigger mechanism 22 in an overlapping relationship with the first spacecraft 16 and the second spacecraft 18, in some embodiments of systems 10, the trigger mechanism 22 may be at least partially coupled to one or more of the spacecraft 12 and/or include components that are coupled to one or both of the first spacecraft 16 and the second spacecraft 18. Additionally or alternatively, the first spacecraft 16 and/or the second spacecraft 18 may include components of the trigger mechanism 22. Accordingly, in some embodiments of systems 10, the trigger mechanism 22 may be positioned within the launch vehicle 14 for operation after launch of the launch vehicle 14, for example, in orbit so that the second spacecraft 18 may be demated from the first spacecraft 16. In such embodiments, the trigger mechanism 22 may be described as an on-board trigger mechanism 22, and a separate demating mechanism 24 may not be required.

Some embodiments of systems 10 may further include a release mechanism 26 that is configured to selectively reconfigure the coupling mechanism 20 from the uncoupled configuration to the coupled configuration. As schematically illustrated in FIG. 1 with a dashed lead line, the release mechanism 26 may be a component of or otherwise be associated with the trigger mechanism 22; however, it also is within the scope of the present disclosure that the release mechanism 26 is separate and apart from the trigger mechanism 22, such as schematically illustrated in dash-dot lines in FIG. 1. The dash-dot representation of the release mechanism 26 in FIG. 1 in an overlapping relationship with the coupling mechanism 20 schematically represents that the release mechanism 26 may be operatively coupled to and/or may be a component of the coupling mechanism 20 and that the release mechanism 26 functionally permits selective reconfiguration of the coupling mechanism 20 from the uncoupled configuration to the biased coupled configuration. In other words, the release mechanism 26 permits the coupling mechanism 20 to automatically return to its coupled configuration upon user input to the release mechanism 26, for example, after the trigger mechanism 22 has previously reconfigured the coupling mechanism 20 from the coupled configuration to the uncoupled configuration in response to user input to the trigger mechanism 22.

In embodiments of systems 10 that include a release mechanism 26, the release mechanism 26 may not need to be operated after the spacecraft 12 are in orbit, because there will be no need to remate, or recouple, the spacecraft 12 once they have been demated, or uncoupled. Accordingly, in some embodiments, the release mechanism 26 may be configured to be operated or operational only when the spacecraft 12 and the launch vehicle 14 are still on earth.

As schematically illustrated in dashed lines in FIG. 1, the first spacecraft 16 and the second spacecraft 18 each may include an interstage adapter 28. An interstage adapter 28 is a structure that is configured to effectively and operatively transfer loads between the first spacecraft 16 and the second spacecraft 18, while the two spacecraft 12 are mated and secured together. For example, when the two spacecraft 12 are still on earth and prior to launch, the weight of the upper spacecraft is transferred to the lower spacecraft by the interstage adapters 28. Interstage adapters 28 may take any suitable form, such as generally cylindrical bodies to which the various components of a spacecraft 12 are operatively attached. An interstage adapter 28 additionally or alternatively may be described as a spacecraft core 28 or as a structural core 28 of a spacecraft 12. The interstage adapter 28 of the first spacecraft 16 is not required to be identical to the interstage adapter 28 of the second spacecraft 18. For example, while both interstage adapters 28 may have similar bodies, such as cylindrical bodies, in some embodiments, the interstage adapter 28 of the first spacecraft 16 may include the coupling mechanism 20. In some embodiments, the coupling mechanism 20 may be operatively coupled to the interstage adapter 28 of one of the first spacecraft 16 and the second spacecraft 18.

Coupling mechanisms 20, trigger mechanisms 22, and optional release mechanisms 26 may take any suitable form and may utilize any suitable motive forces to operatively reconfigure the coupling mechanism 20 between the uncoupled configuration and the coupled configuration. As used herein, the term "motive force" refers to the primary force that is operative to reconfigure the coupling mechanism 20 from the coupled configuration to the uncoupled configuration and/or from the uncoupled configuration to the coupled configuration. Illustrative, non-exclusive examples of motive forces include (but are not limited to) pneumatic pressure, hydraulic pressure, spring force, and direct mechanical force, such as a compressive or tensile force applied by a mechanical member.

In some embodiments, the coupling mechanism 20 utilizes a different motive force for transitioning from the coupled configuration to the uncoupled configuration than from the uncoupled configuration to the coupled configuration. For example, a pneumatic pressure or hydraulic pressure may be utilized to transition the coupling mechanism 20 from the coupled configuration to the uncoupled configuration, and a spring force may be utilized to transition the coupling mechanism 20 from the uncoupled configuration to the coupled configuration. Other configurations are within the scope of the present disclosure.

In the example of a pneumatic pressure being utilized to transition the coupling mechanism 20 from the coupled configuration to the uncoupled configuration, the trigger mechanism 22 may include a volume of pressurized gas 30. In such embodiments, the coupling mechanism 20 may be described as being pneumatic or as including a pneumatic system. Similarly, in the non-exclusive example of a hydraulic pressure being utilized to transition the coupling mechanism 20 from the coupled configuration to the uncoupled configuration, the trigger mechanism 22 may include a source of hydraulic pressure 32. In such embodiments, the coupling mechanism 20 may be described as being hydraulic or as including a hydraulic system. In pneumatic coupling mechanisms 20 as well as in hydraulic coupling mechanisms 20, the trigger mechanism 22 may be described as being configured to selectively pressurize the coupling mechanism 20 to reconfigure the coupling mechanism 20 from the coupled configuration to the uncoupled configuration.

In embodiments of systems 10 that utilize a trigger mechanism 22 that is configured to selectively pressurize the coupling mechanism 20 to reconfigure the coupling mechanism 20 from the coupled configuration to the uncoupled configuration, an optional release mechanism 26 may be provided, and the release mechanism 26 may be configured to selectively depressurize the coupling mechanism 20 to reconfigure the coupling mechanism 20 from the uncoupled configuration to the coupled configuration. For example, with the coupling mechanism 20 in the uncoupled configuration, such as due to a pressure applied from the trigger mechanism 22, the second spacecraft 18 may be appropriately positioned relative to the first spacecraft 16. Then, when the second spacecraft 18 is appropriately positioned relative to the first spacecraft 16, the release mechanism 26 may receive user input to selectively release the pressure in the coupling mechanism 20, causing the bias of the coupling mechanism 20 to automatically return to the coupled configuration, and thereby operatively secure the second spacecraft 18 to the first spacecraft 16. As an illustrative, non-exclusive example, the release mechanism 26 may include a release valve 34.

As mentioned, in some embodiments, a spring force may be the motive force that is utilized to transition the coupling mechanism 20 from the uncoupled configuration to the coupled configuration. In other words, a spring force may be the force that biases the coupling mechanism 20 from the uncoupled configuration toward the coupled configuration. Accordingly, as schematically represented in FIG. 1, the coupling mechanism 20 may include one or more springs 36 that are operative to restrict demating of the second spacecraft 18 from the first spacecraft 16 when the spacecraft 12 are operatively coupled together.

As an illustrative, non-exclusive example, the one or more springs 36 may be operative to bias one or more pins 38 to extend through one or more bores 40 defined by the first spacecraft 16 and one or more bores 42 defined by the second spacecraft 18 when aligned with the corresponding one or more bores 40 of the first spacecraft 16. Accordingly, some embodiments of coupling mechanisms 20 may be described as including one or more coupler assemblies 44 that include a pin 38 and a spring 36, as schematically indicated in FIG. 1.

Figure 2:
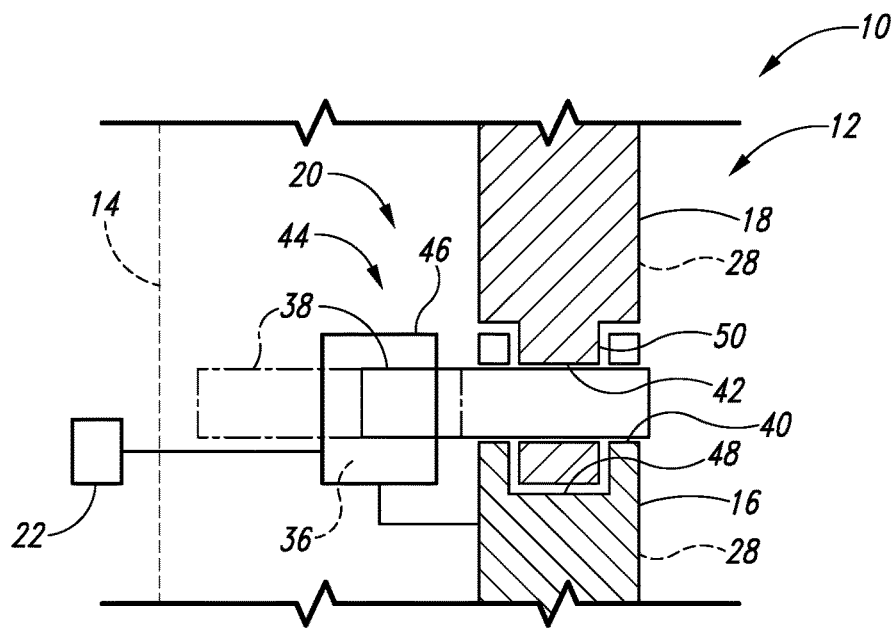
FIG. 2 is a fragmentary, partial cross-sectional schematic diagram representing systems for interconnecting dual manifested spacecraft.

FIG. 2 schematically illustrates dual manifested spacecraft 12 in a mated configuration and with a coupling mechanism 20 having a coupler assembly 44. As discussed, a coupler assembly 44 may include a spring 36 and a pin 38. Additionally, a coupler assembly 44 may include a housing 46 that is operatively coupled to the first spacecraft 16 and that supports the pin 38. As schematically illustrated in FIG. 2, the first spacecraft 16 may define at least one bore 40 that is positioned to be aligned with at least one bore 42 that is defined by the second spacecraft 18 when the second spacecraft 18 is mated with the first spacecraft 16. In such embodiments, the coupling mechanism 20 may include at least one pin 38 that is configured to extend through the bores 40, 42 when aligned and when the coupling mechanism 20 is in the coupled configuration. The pin 38 is configured to translate relative to the housing 46, and in FIG. 2, the pin 38 is illustrated in solid lines with the coupling mechanism 20 in the coupled configuration and in dash-dot lines with the coupling mechanism 20 in the uncoupled configuration. Other configurations of coupling mechanisms 20 and coupler assemblies 44 also are within the scope of the present disclosure.

In some embodiments, the housing 46 of a coupler assembly 44 may be configured to restrict rotation of the corresponding pin 38 relative to the housing 46. Stated differently, the housing 46 and the corresponding pin 38 may be keyed to restrict rotation of the pin 38 relative to the housing 46.

In some embodiments, a clearance (or tolerance) between a pin 38 and aligned bores 40, 42 may be selected so that the pin 38 is configured to bear (or carry) a vertical load associated with the second spacecraft 18 when it is mated with the first spacecraft 16 and when the coupling mechanism 20 is in its coupled configuration and thus when the pin 38 extends through the aligned bores 40, 42. As illustrative, non-exclusive examples, a vertical clearance between a pin 38 and the corresponding bores 40, 42 may be at least 0.05, 0.06, 0.07, 0.08, 0.09, or 0.1 millimeter and/or is less than or equal to 0.05, 0.06, 0.07, 0.08, 0.09, or 0.1 millimeter.

Additionally or alternatively, a clearance (or tolerance) between a pin 38 and aligned bores 40, 42 may be selected so that the pin 38 is configured to not bear (or carry) a significant lateral load associated with lateral or rotational movement of the second spacecraft 18 relative to the first spacecraft 16 when the second spacecraft 18 is mated with the first spacecraft 16 and when the coupling mechanism 20 is in the coupled configuration and thus when the pin 38 extends through the aligned bores 40, 42. As illustrative, non-exclusive examples, a maximum lateral clearance between a pin 38 and the corresponding bores 40, 42 may be at least 0.2, 0.3, 0.4, or 0.5 millimeter and/or is less or equal to 0.2, 0.3, 0.4, or 0.5 millimeter.

Figure 3:
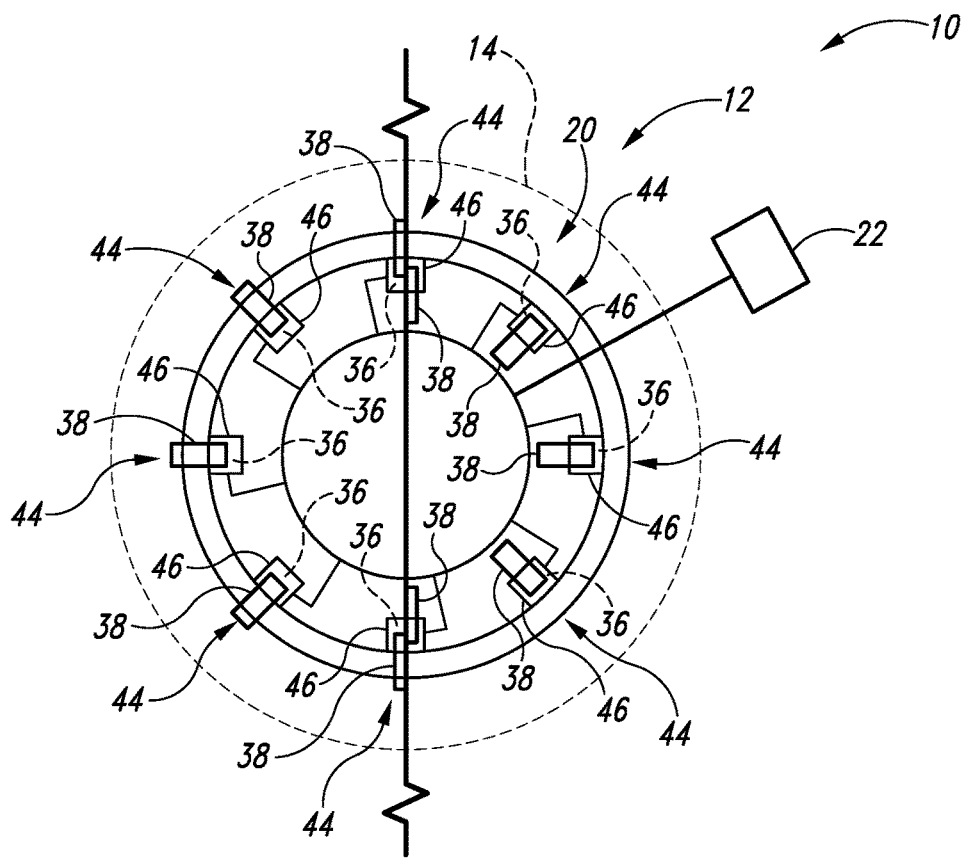
FIG. 3 is a schematic plan view representing illustrative, non-exclusive examples of systems for interconnecting dual manifested spacecraft.

Additionally or alternatively, some embodiments of systems 10 may include a plurality of bores 40 that are positioned to be aligned with a plurality of bores 42. In such embodiments, the coupling mechanism 20 includes a plurality of pins 38 that are configured to extend through the bores 40, 42 when respectively aligned and when the coupling mechanism 20 is in the coupled configuration. Accordingly, a coupling mechanism 20 may be described as including a plurality of coupler assemblies 44 corresponding to the plurality of pins 38, and in embodiments that include a plurality of springs 36, respectively corresponding to the plurality of springs 36. As illustrative, non-exclusive examples, a coupling mechanism 20 may (but is not required to) include at least 2, 6, 12, 16, 20, or 24 coupler assemblies 44. FIG. 3 schematically represents an illustrative, non-exclusive example of a coupling mechanism 20 that includes eight coupler assemblies 44. On the left side of FIG. 3, the coupling mechanism 20 is illustrated in the coupled configuration, and thus with the pins 38 extending through the corresponding bores 40, 42 defined by the spacecraft 12. On the right side of FIG. 3, the coupling mechanism 20 is illustrated in the uncoupled configuration, and thus with the pins 38 not extending through the corresponding bores 40, 42 defined by the spacecraft 12.

Also in FIG. 3, the trigger mechanism 22 is schematically illustrated as being operatively connected to each of the coupler assemblies 44. In some embodiments, the coupling mechanism 20 may be configured such that when the coupling mechanism 20 transitions from the uncoupled configuration to the coupled configuration, the pins 38 simultaneously translate relative to the respective housings 46. For example, when a system 10 includes a pneumatic or hydraulic coupling mechanism 20, the associated pneumatic or hydraulic pressure of the coupling mechanism 20 may simultaneously translate the pins 38 relative to the respective housings 46 of the coupler assemblies 44.

In some embodiments, the coupling mechanism 20 may be configured to utilize a single motive force to transition the coupling mechanism 20 from the coupled configuration to the uncoupled configuration. The example of a pneumatic or hydraulic coupling mechanism 20 with a plurality of coupler assemblies 44 is an example of such a coupling mechanism 20. Additionally or alternatively, a coupling mechanism 20 may be configured to utilize individual motive forces to cause each pin 38 to translate relative to the respective housing 46 when the coupling mechanism 20 transitions from the uncoupled configuration to the coupled configuration. The example of coupler assemblies 44 each including a spring 36 is an example of such a coupling mechanism 20.

Referring back to FIG. 2, one of the first spacecraft 16 and the second spacecraft 18 may define a channel 48 and the other of the first spacecraft 16 and the second spacecraft 18 may define a collar 50 that is configured to be positioned within the channel 48 when the second spacecraft 18 is mated with the first spacecraft 16. In the schematically illustrated example of FIG. 2, the first spacecraft 16 defines the channel 48 and the second spacecraft 18 defines the collar 50. Moreover, in such embodiments, it is within the scope of the present disclosure that the bore(s) 40 extend through the portion of the first spacecraft 16 that defines the channel 48 and that the bore(s) 42 extend through the collar 50. In some embodiments, the channel 48 and the collar 50 may be defined by the optional interstage adapters 28 of the spacecraft 12.

Additionally or alternatively, such as schematically and optionally represented in FIGS. 1 and 2, a bore 40 may be defined by the optional interstage adapter 28 of the first spacecraft 16, and a bore 42 may be defined by the optional interstage adapter 28 of the second spacecraft 18. Other configurations also are within the scope of the present disclosure.

In some embodiments, the coupling mechanism 20 may be free of one or more of motors, gears, and/or electrical actuators. Additionally or alternatively, the coupling mechanism 20 may be described as being not electrically powered. Even in such non-electrically powered systems, electrical components, such as sensors and switches, may be utilized, but such devices as electric motors and electrical actuators may not provide the motive force for reconfiguring the coupling mechanism 20 between the coupled configuration and the uncoupled configuration.

In some embodiments, as schematically indicated in FIG. 1, the first spacecraft 16 may define alignment structure 52, and the second spacecraft 18 may define alignment structure 54 that is configured to mate with the alignment structure 52 when the second spacecraft 18 is appropriately positioned relative to the first spacecraft 16 so that the coupling mechanism 20 may be operatively configured to the coupled configuration and thereby secure the second spacecraft 18 to the first spacecraft 16. Optional alignment structure 52 and optional alignment structure 54 are configured to ensure a precise and appropriate positioning of the spacecraft 12 relative to each other. As an illustrative, non-exclusive example, one of the alignment structure 52 and the alignment structure 54 may include a projection and the other of the alignment structure 52 and the alignment structure 54 may include a cavity that is sized and shaped to receive the projection. A predetermined tolerance between the two structures may be utilized that ensures appropriate alignment of other aspects of the spacecraft 12 and/or the coupling mechanism 20, such as (but not limited to) the optional bores 40, 42 and pins 38. As illustrative, non-exclusive examples, a radial clearance between a projection and a cavity may be at least 0.03, 0.04, 0.05, 0.06, 0.07, or 0.08 millimeter and/or is less than or equal to 0.03, 0.04, 0.05, 0.06, 0.07, or 0.08 millimeter. Any suitable number of optional alignment structures 52, 54 may be utilized, including (but not limited to) 2-48 alignment structures 52, 54.

Moreover, the shapes of the alignment structures 52, 54 may be selected to facilitate proper alignment during a mating process. As an illustrative, non-exclusive example, a projection may have one or more ramped surfaces that mate with corresponding one or more ramped surfaces of a cavity. Truncated cones are examples of shapes that may be appropriate to facilitate proper alignment of the spacecraft 12 relative to each other.

In some embodiments, the first spacecraft 16 may include a plurality of alignment structures 52, and the second spacecraft 18 may include a plurality of corresponding alignment structures 54. In FIG. 1, the alignment structures 52, 54 are schematically illustrated in an overlapping relationship with the optional respective interstage adapters 28, schematically representing that in some such embodiments, the alignment structures 52, 54 may be defined by the respective interstage adapters 28. In FIG. 1, the alignment structures 52, 54 also are schematically illustrated in an overlapping relationship with the coupling mechanism 20, schematically representing that the alignment structures 52, 54 may facilitate proper operation of the coupling mechanism 20, for example, ensuring that the spacecraft 12 are appropriately positioned relative to each other so that the coupling mechanism 20 may transition to the coupled configuration and thereby restrict demating of the second spacecraft 18 from the first spacecraft 16.

Turning now to FIGS. 4-7, an illustrative non-exclusive example of a system 10 in the form of a system 100 having a coupling mechanism 20 in the form of a pneumatic coupling mechanism 200 is illustrated. Where appropriate, the reference numerals from the schematic illustrations of FIGS. 1-3 are used to designate corresponding parts of system 100; however, the example of FIGS. 4-7 is non-exclusive and does not limit systems 10 to the illustrated embodiment of system 100. That is, systems 10 are not limited to the specific embodiment of the illustrated system 100, and systems 10 may incorporate any number of the various aspects, configurations, characteristics, properties, etc. of systems 10 that are illustrated in and discussed with reference to the schematic representations of FIGS. 1-3 and/or the embodiment of FIGS. 4-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to system 100; however, it is within the scope of the present disclosure that the previously discussed features, variants, etc. may be utilized with system 100.

Figure 4:
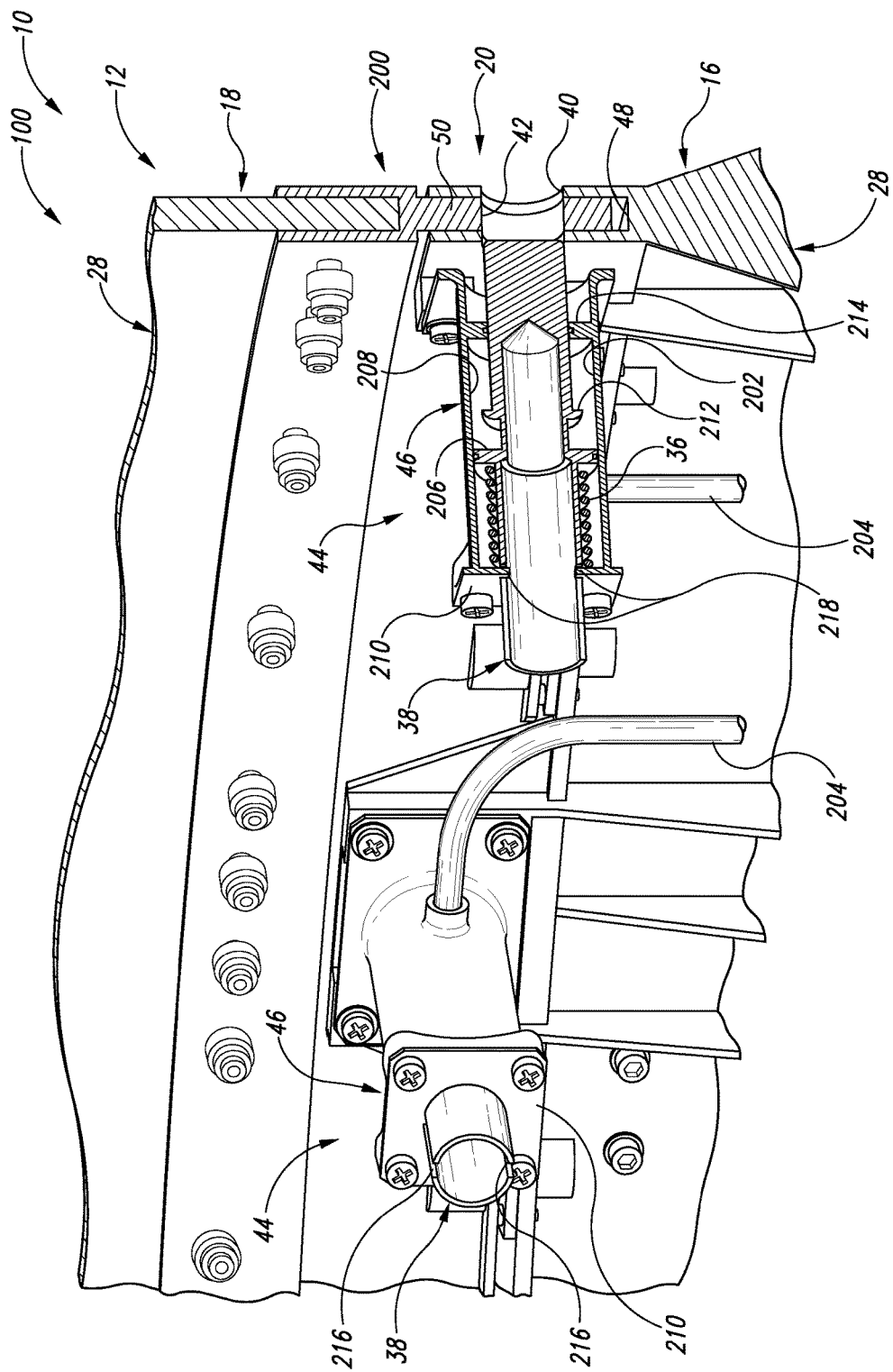
FIG. 4 is a fragmentary, cross-sectional isometric view showing a portion of an illustrative, non-exclusive example of a system for interconnecting dual manifested spacecraft, with the system in an uncoupled configuration, and together with portions of the dual manifested spacecraft.
Figure 5:
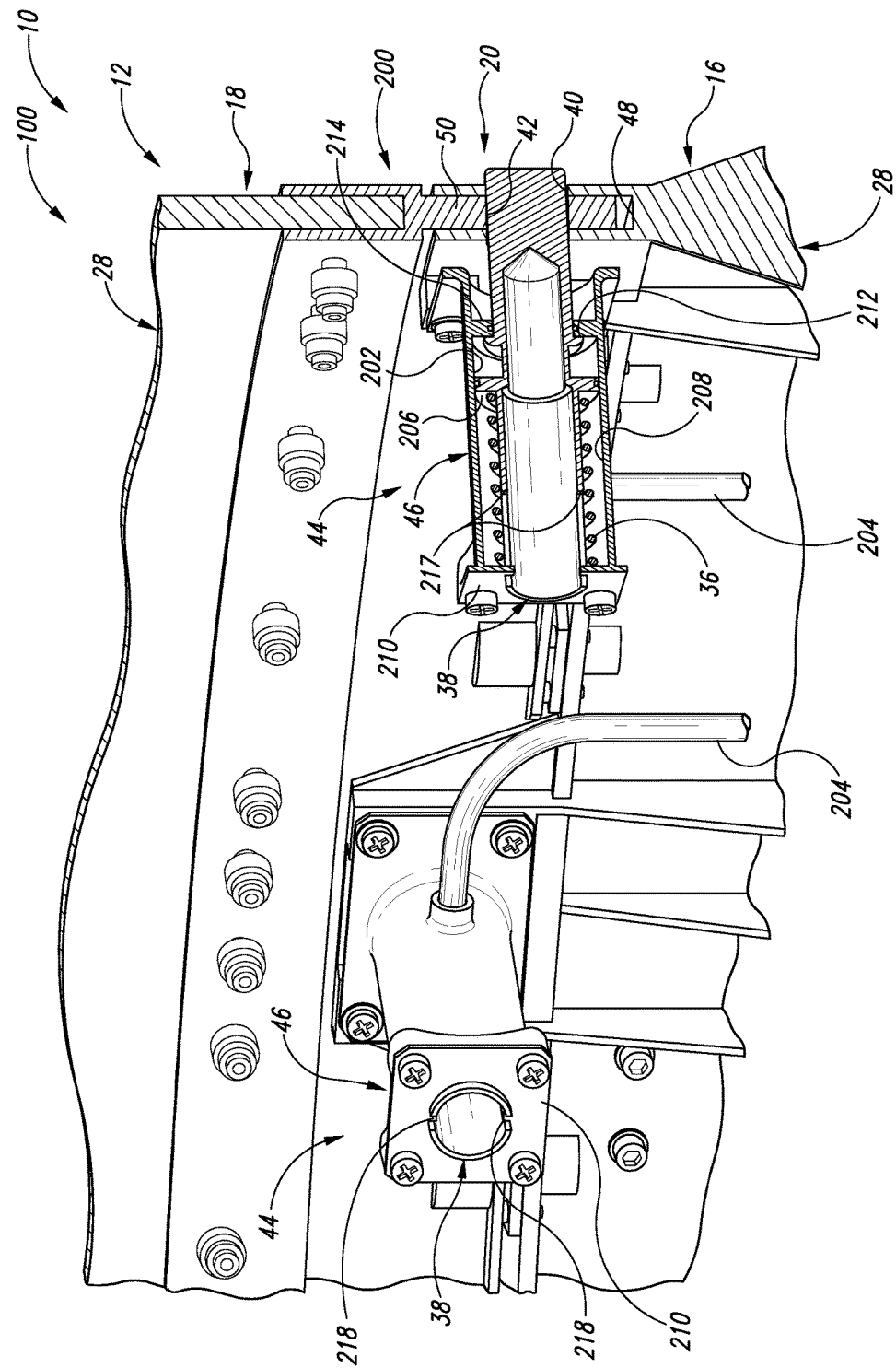
FIG. 5 is a fragmentary, cross-sectional isometric view of the system for interconnecting dual manifested spacecraft and the dual manifested spacecraft of FIG. 4, with the system in a coupled configuration.

FIGS. 4-5 illustrate two coupler assemblies 44, with FIG. 4 illustrating the pneumatic coupling mechanism 200 in the uncoupled configuration and with FIG. 5 illustrating the pneumatic coupling mechanism 200 in the coupled configuration. The illustrated pneumatic coupling mechanism 200 is being utilized with spacecraft 12 that each include an optional interstage adapter 28, with the interstage adapter 28 of the first spacecraft 16 defining a circular channel 48 and with the interstage adapter 28 of the second spacecraft 18 defining a circular collar 50. Moreover, the interstage adapters 28 of the first spacecraft 16 and the second spacecraft 18 define bores 40 and bores 42, respectively.

As seen in FIGS. 4-5, pneumatic coupling mechanism 200 is an example of a coupling mechanism 20 that includes a plurality of coupler assemblies 44, with each coupler assembly 44 including a housing 46 that supports a pin 38 and a spring 36. As seen in the cross-sectional representations of coupler assemblies 44 in FIGS. 4-5, each housing 46 defines an internal chamber 202 that is fluidly connected to pneumatic gas lines 204. Each pin 38 defines a piston structure 206 that with the housing 46 defines a pressure chamber 208. Each spring 36 of coupler assembly 44 is a coil spring and is positioned within the housing 46 opposite the piston structure 206 and is engaged with the piston structure 206 and an end cap 210 of the housing 46. Accordingly, when a trigger mechanism 22 selectively applies pneumatic pressure to the pressure chambers 208 via the pneumatic gas lines 204, the pneumatic pressure overcomes the spring force, or bias, of the springs 36, and translates the pins 38 in an inward radial direction, as illustrated in FIG. 4. When an associated release mechanism 26 removes the pressure within the pressure chambers 208, such as by venting the pneumatic gas to atmosphere, the spring force of the springs 36 translate the pins 38 in an outward radial direction, through the bores 40,42 when the spacecraft are appropriately aligned, thereby securing the second spacecraft 18 to the first spacecraft 16, as illustrated in FIG. 5.

Pins 38 of pneumatic coupling mechanism 200 also include a stop flange 212 that is positioned to engage an internal flange 214 of the housing 46 and thereby limit the outward radial movement of the pins 38 when the pneumatic coupling mechanism 200 is transitioning to the coupled configuration. The engagement of the internal flange 214 and the stop flange 212 also maintains the position of the piston structure 206 inward of the inlet of the pneumatic gas line 204, so that when the trigger mechanism 22 pressurizes the pressure chamber 208, the pin 38 will operatively translate radially inwardly.

Pins 38 and housings 46 of pneumatic coupling mechanism 200 are examples of pins 38 and housings 46 that are keyed to restrict rotation of the pins 38 relative to the respective housings 46. As seen in FIGS. 4-5, the pins 38 each define a pair of channels 216, within which a pair of projections 218 defined by the end cap 210 are positioned. Moreover, the channels 216 terminate and define stop surfaces 217 that engage the projections 218 when the coupling mechanism is transitioning to the uncoupled configuration, as illustrated in FIG. 4.

Figure 6:
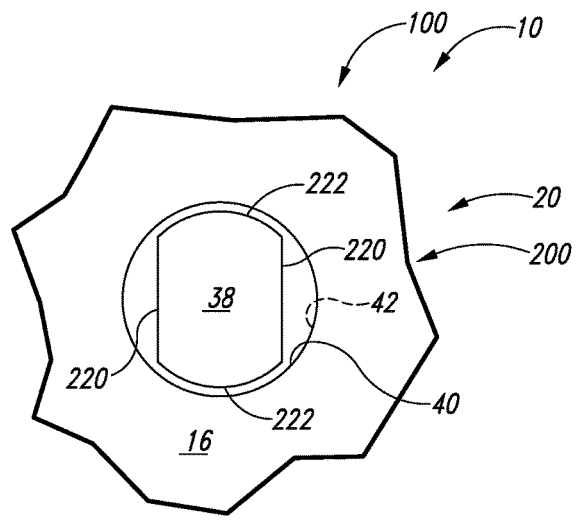
FIG. 6 is a fragmentary side view of a portion of dual manifested spacecraft and the system for interconnecting dual manifested spacecraft of FIG. 4, showing an interface between a pin of the system and associated bores of the spacecraft.

Turning now to FIG. 6, an end view of a pin 38 of the pneumatic coupling mechanism 200 relative to bores 40, 42 is illustrated. As seen, the bores 40, 42 are circular, and the portion of the pin 38 that extends through the bores 40, 42 has lateral planar sides 220 and curved upper and lower sides 222. Accordingly, the pins 38 of pneumatic coupling mechanism 200 are an example of pins 38 that are configured to bear a vertical load associated with the second spacecraft 18 and are configured to not bear a significant lateral, or radial, load associated with lateral movement of the second spacecraft 18 relative to the first spacecraft 16. As discussed herein, a pin 38 and bores 40, 42 may define a maximum lateral clearance. With reference to FIG. 6, this maximum lateral clearance is defined by the maximum perpendicular distance between the lateral planar sides 220 and the adjacent sides of the bores 40, 42.

Figure 7:
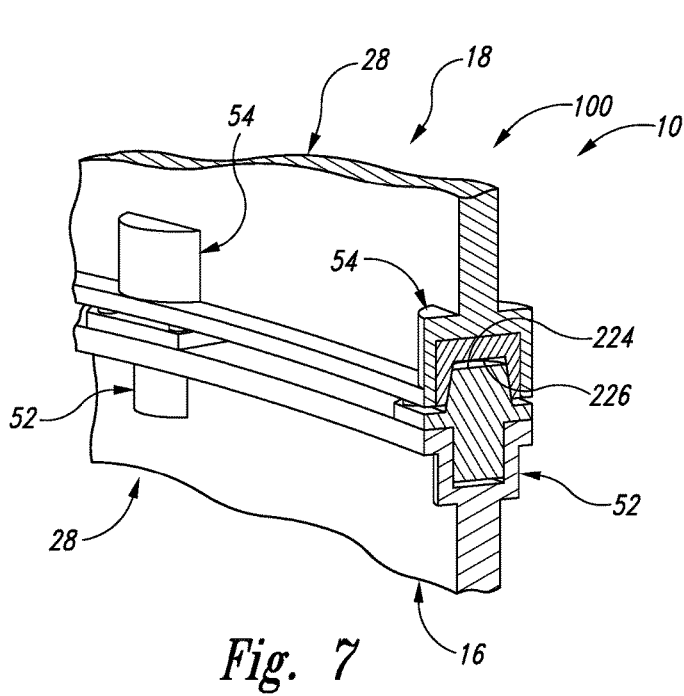
FIG. 7 is a fragmentary, cross-sectional isometric view showing another portion of the system for interconnecting dual manifested spacecraft and the dual manifested spacecraft of FIG. 4, showing an interface between the spacecraft.

FIG. 7 illustrates the alignment structures 52, 54 of system 100. As seen in cross-section, the first spacecraft 16 defines a projection 224 in the shape of a truncated cone, and the second spacecraft 18 defines a corresponding cavity 226 in the shape of a truncated cone.

Figure 8:
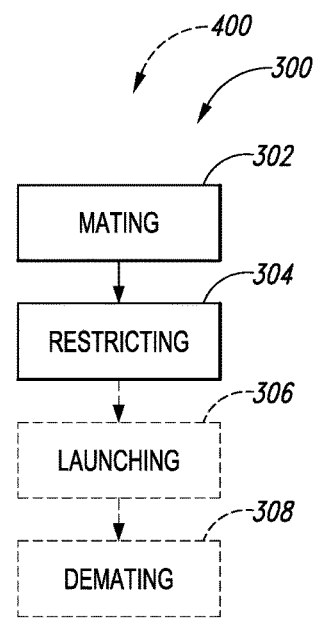
FIG. 8 is a flowchart schematically representing illustrative, non-exclusive examples of methods according to the present disclosure.

FIG. 8 schematically provides a flowchart that represents illustrative, non-exclusive examples of methods according to the present disclosure. In FIG. 8, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 8 are not limiting and other methods and steps are within the scope of the present disclosure, including methods having greater than or fewer than the number of steps illustrated, as understood from the discussions herein.

FIG. 8 schematically represents illustrative, non-exclusive examples of methods 300 for interconnecting dual manifested spacecraft 12 for launch in a launch vehicle 14. As illustrated in solid boxes, a method 300 may include at least the steps of mating a first spacecraft 16 to a second spacecraft 18, as indicated at 302, and after the mating 302, restricting demating (or disengaging) of the second spacecraft 18 from the first spacecraft 16, as indicated at 304.

In some methods 300, the mating 302 may include utilizing a first motive force to permit the mating, and the restricting 304 may include utilizing a second motive force to restrict the demating. In some methods, the first motive force may be different than the second motive force. For example, the first motive force may include pneumatic or hydraulic pressure and the second motive force may include a spring force. Additionally or alternatively, the mating 302 may include pressurizing a pneumatic coupling mechanism 20, and the restricting 304 may include depressurizing the pneumatic coupling mechanism 20. In some such methods 300, the pressurizing the pneumatic coupling mechanism 20 may include utilizing a source of pressurized gas, and the source of pressurized gas may be outside of the launch vehicle 14 and may not launch with the launch vehicle 14. Additionally or alternatively, the mating 302 may include pressurizing a hydraulic coupling mechanism 20, and the restricting 304 may include depressurizing the hydraulic coupling mechanism 20. In some such methods 300, the pressurizing may include utilizing a source of hydraulic fluid, and the source of hydraulic fluid may be outside of the launch vehicle 14 and may not launch with the launch vehicle 14. Additionally or alternatively, the mating 302 and the restricting 304 may not utilize one or more of motors, gears, and/or electrical actuators.

Some methods 300 also may include after the restricting 304, launching the launch vehicle 14, as optionally indicated in a dashed box at 306, and then after the launching 306, demating (or disengaging) the second spacecraft 18 from the first spacecraft 16, as optionally indicated in a dashed box at 308. Methods 300 that include launching 306 and demating 308 additionally or alternatively may be described as methods 400 of placing two spacecraft in orbit.

In some methods 400, the demating 308 may include repressurizing the pneumatic coupling mechanism 20 or the hydraulic coupling mechanism 20, depending on the configuration of coupling mechanism 20 being utilized. Alternatively, in some methods 400, demating 308 may not include repressurizing a coupling mechanism 20 and/or otherwise reconfiguring a coupling mechanism 20, and instead may utilize a separate and distinct demating mechanism 24, such as a pyrotechnic system.

Methods 300 and 400 may utilize any of the systems 10 disclosed herein; however, methods 300 and 400 are not limited to using the disclosed systems 10 and any suitable systems and mechanisms may be utilized.

Illustrative, non-exclusive examples of inventive subject matter according to the present disclosure are described in the following enumerated paragraphs:

A. A system for interconnecting dual manifested spacecraft for launch by a launch vehicle, the system comprising:

a coupling mechanism configured to be operatively coupled to a first spacecraft, wherein when the coupling mechanism is operatively coupled to the first spacecraft, the coupling mechanism is configured to selectively and securely couple the first spacecraft to a second spacecraft, wherein the coupling mechanism has an uncoupled configuration (or position), in which the coupling mechanism is configured to permit the second spacecraft to become mated with the first spacecraft, and a coupled configuration (or position), in which the coupling mechanism is configured to restrict the second spacecraft from being demated (or disengaged) from the first spacecraft, and wherein the coupling mechanism is biased (and optionally spring biased) to the coupled configuration; and a trigger mechanism configured to selectively reconfigure the coupling mechanism from the coupled configuration to the uncoupled configuration to permit mating of the second spacecraft to the first spacecraft.

A1. The system of paragraph A, further comprising:
the launch vehicle.

A2. The system of any of paragraphs A-A1, further comprising:
the first spacecraft and the second spacecraft and optionally the launch vehicle, wherein the coupling mechanism is operatively coupled to the first spacecraft.

A2.1 The system of paragraph A2, wherein the first spacecraft and the second spacecraft each include an interstage adapter, and wherein the coupling mechanism is operatively coupled to the interstage adapter of the first spacecraft or wherein the interstage adapter of the first spacecraft includes the coupling mechanism.

A3. The system of any of paragraphs A-A2.1,
wherein the first spacecraft defines at least one bore and the second spacecraft defines at least one bore that is positioned to be aligned with the at least one bore of the first spacecraft when the second spacecraft is mated with the first spacecraft; and
wherein the coupling mechanism includes at least one pin that is configured to extend through the at least one bore of the first spacecraft and the at least one bore of the second spacecraft when aligned and when the coupling mechanism is in the coupled configuration.

A3.1 The system of paragraph A3, wherein the at least one pin is biased (and optionally spring biased) to extend though the at least one bore of the first spacecraft and the at least one bore of the second spacecraft when aligned and when the coupling mechanism is in the coupled configuration.

A3.2 The system of any of paragraphs A3-A3.1, wherein the at least one bore of the first spacecraft includes a plurality of bores and the at least one bore of the second spacecraft includes a plurality of bores corresponding to the plurality of bores of the first spacecraft, and wherein the coupling mechanism includes a plurality of pins corresponding to the plurality of bores of the first spacecraft and the second spacecraft.

A3.3 The system of any of paragraphs A3-A3.2 when depending from paragraph A2.1, wherein the at least one bore of the first spacecraft is defined by the interstage adapter of the first spacecraft and the at least one bore of the second spacecraft is defined by the interstage adapter of the second spacecraft.

A3.4 The system of any of paragraphs A3-A3.3, wherein the at least one pin is configured to bear (or carry) a vertical load associated with the second spacecraft when the second spacecraft is mated with the first spacecraft and when the coupling mechanism is in the coupled configuration.

A3.4.1 The system of paragraph A3.4, wherein the at least one pin is configured to not bear (or carry) a significant lateral load associated with lateral or rotational movement of the second spacecraft relative to the first spacecraft when the second spacecraft is mated with the first spacecraft and when the coupling mechanism is in the coupled configuration.

A3.4.1.1 The system of paragraph A3.4.1, wherein the at least one bore of the first spacecraft and the at least one bore of the second spacecraft are circular, and wherein a portion of the at least one pin that extends through the at least one bore of the first spacecraft and the at least one bore of the second spacecraft when the second spacecraft is mated with the first spacecraft and when the coupling mechanism is in the coupled configuration has planar lateral sides and curved upper and lower sides.

A3.4.1.1.1 The system of paragraph A3.4.1.1, wherein a maximum lateral clearance between the planar lateral sides and the at least one bore is at least 0.2, 0.3, 0.4, or 0.5 millimeter and/or is less or equal to 0.2, 0.3, 0.4, or 0.5 millimeter.

A3.4.1.2 The system of any of paragraphs A3.4.1-A3.4.1.1.1, wherein a vertical clearance between the at least one pin and the at least one bore is at least 0.05, 0.06, 0.07, 0.08, 0.09, or 0.1 millimeter and/or is less than or equal to 0.05, 0.06, 0.07, 0.08, 0.09, or 0.1 millimeter.

A3.5 The system of any of paragraphs A3-A3.4.1.2, wherein the coupling mechanism includes at least one coupler assembly that includes a housing and the at least one pin, wherein the at least one pin is supported by the housing and configured to translate relative to the housing, and wherein the housing is configured to be operatively coupled to the first spacecraft (and when depending from paragraph A2, is operatively coupled to the first spacecraft).

A3.5.1 The system of paragraph A3.5, wherein the housing is configured to restrict rotation of the at least one pin relative to the housing, and optionally wherein the housing and the at least one pin are keyed to restrict rotation of the at least one pin relative to the housing.

A3.5.2 The system of any of paragraphs A3.5-A3.5.1 when depending from paragraph A3.2, wherein the at least one coupler assembly includes a plurality of coupler assemblies corresponding to the plurality of pins, and optionally wherein the plurality of coupler assemblies includes at least 2, 6, 12, 16, 20, or 24 coupler assemblies.

A3.5.2.1 The system of paragraph A3.5.2, wherein the coupling mechanism is configured such that when the coupling mechanism transitions from the uncoupled configuration to the coupled configuration, the plurality of pins simultaneously translates relative to the housing.

A3.5.3 The system of any of paragraphs A3.5-A3.5.2.1, wherein the at least one coupler assembly includes a plurality of coupler assemblies, wherein the at least one pin includes a plurality of pins respectively associated with the plurality of coupler assemblies, wherein the at least one bore of the first spacecraft includes a plurality of bores of the first spacecraft associated with the plurality of pins, and wherein the at least one bore of the second spacecraft includes a plurality of bores of the second spacecraft associated with the plurality of pins.

A3.5.3.1 The system of paragraph A3.5.3, wherein the coupling mechanism is configured such that when the coupling mechanism transitions from the coupled configuration to the uncoupled configuration, a single source of motive force (optionally pneumatic pressure) causes each of the plurality of pins to translate in a first direction (optionally a first radial direction), and wherein the coupling mechanism is configured such that when the coupling mechanism transitions from the uncoupled configuration to the coupled configuration, individual motive forces (optionally individual spring forces) cause respective pins of the plurality of pins to translate in a second direction (optionally a second radial direction) that is opposite the first direction (optionally the first radial direction).

A4. The system of any of paragraphs A-A3.5.3.1, wherein one of the first spacecraft and the second spacecraft defines a channel and the other of the first spacecraft and the second spacecraft defines a collar configured to be positioned within the channel when the second spacecraft is mated with the first spacecraft.

A4.1 The system of paragraph A4 when depending from paragraph A2.1, wherein the interstage adapter of one of the first spacecraft and the second spacecraft defines the collar and the interstage adapter of the other of the first spacecraft and the second spacecraft defines the channel.

A4.2 The system of any of paragraphs A4-A4.1 when depending from paragraph A3, wherein the at least one bore of one of the first spacecraft and the second spacecraft extends through the collar, and wherein the at least one bore of the other of the first spacecraft and the second spacecraft extends through structure that defines the channel.

A4.3 The system of any of paragraphs A4-A4.2, wherein the collar and the channel have generally circular perpendicular profiles.

A5. The system of any of paragraphs A-A4.3, wherein one of the first spacecraft and the second spacecraft defines at least one projection and the other of the first spacecraft and the second spacecraft defines at least one cavity configured to mate with the at least one projection when the second spacecraft is mated with the first spacecraft.

A5.1 The system of paragraph A5, wherein the at least one projection defines a truncated cone, and wherein the at least one cavity defines a void that is in the shape of a truncated cone.

A5.2 The system of any of paragraphs A5-A5.1, wherein a radial clearance between the at least one projection and the at least one cavity is at least 0.03, 0.04, 0.05, 0.06, 0.07, or 0.08 millimeter and/or is less than or equal to 0.03, 0.04, 0.05, 0.06, 0.07, or 0.08 millimeter.

A6. The system of any of paragraphs A-A5.2, wherein the coupling mechanism includes a pneumatic system, and wherein the trigger mechanism includes a volume of pressurized gas, and optionally a volume of pressurized helium or xenon, and optionally wherein the volume of pressurized gas is a ground-based source of pressurized gas and does not launch with the launch vehicle or optionally wherein the volume of pressurized gas is an on-board volume of pressurized gas and is configured to launch with the launch vehicle.

A7. The system of any of paragraphs A-A5.2, wherein the coupling mechanism includes a hydraulic system, and wherein the trigger mechanism includes a source of hydraulic fluid, and optionally wherein the source of hydraulic fluid is a ground-based source of hydraulic fluid and does not launch with the launch vehicle or optionally wherein the source of hydraulic fluid is an on-board source of hydraulic fluid and is configured to launch with the launch vehicle.

A8. The system of any of paragraphs A6-A7, wherein the trigger mechanism is configured to selectively pressurize the coupling mechanism to reconfigure the coupling mechanism from the coupled configuration to the uncoupled configuration.

A8.1 The system of paragraph A8, wherein the system includes a release mechanism that is configured to selectively depressurize the coupling mechanism to reconfigure the coupling mechanism from the uncoupled configuration to the coupled configuration.

A9. The system of any of paragraphs A-A8.1, wherein the trigger mechanism is configured to be positioned outside of the launch vehicle and to remain on earth upon launch of the launch vehicle.

A9.1 The system of paragraph A9, wherein the trigger mechanism is configured to be selectively and operatively coupled to and decoupled from the coupling mechanism only when the launch vehicle is on earth and not after launch of the launch vehicle.

A10. The system of any of paragraphs A-A9.1, wherein the system is configured to permit reconfiguring of the coupling mechanism from the coupled configuration to the uncoupled configuration only when the launch vehicle is on earth and not after launch of the launch vehicle.

A11. The system of any of paragraphs A-A10, wherein the dual manifested spacecraft includes a pyrotechnic system configured to selectively demate the second spacecraft from the first spacecraft, and wherein the pyrotechnic system is separate and distinct from the coupling mechanism.

A12. The system of any of paragraphs A-A8.1, wherein the trigger mechanism is configured to be positioned within the launch vehicle for operation after launch of the launch vehicle.

A13. The system of any of paragraphs A-A12, wherein the coupling mechanism has a mass that is less than 30, 25, 20, 15, 10, or 5 kilograms.

A14. The system of any of paragraphs A-A13, wherein the coupling mechanism is free of one or more of motors, gears, and electrical actuators.

A15. The system of any of paragraphs A-A14, wherein the coupling mechanism utilizes a different motive force for transitioning from the coupled configuration to the uncoupled configuration than from the uncoupled configuration to the coupled configuration.

A15.1 The system of paragraph A15, wherein the coupling mechanism utilizes pneumatic pressure (or hydraulic pressure when depending from paragraph A7) for transitioning from the coupled configuration to the uncoupled configuration and spring force for transitioning from the uncoupled configuration to the coupled configuration.

A16 The system of any of paragraphs A-A15.1, wherein the coupling mechanism is not electrically powered.

B. A method for interconnecting dual manifested spacecraft for launch in a launch vehicle, the method comprising:
mating a first spacecraft to a second spacecraft; and
after the mating, restricting demating (or disengaging) of the second spacecraft from the first spacecraft.

B1. The method of paragraph B, wherein the mating includes utilizing a first motive force to permit the mating, and wherein the restricting includes utilizing a second motive force to restrict demating.

B1.1 The method of paragraph B1, wherein the first motive force is pneumatic pressure or hydraulic pressure and the second motive force is spring force.

B2. The method of any of paragraphs B-B1.1, wherein the mating includes pressurizing a pneumatic coupling mechanism and the restricting includes depressurizing the pneumatic coupling mechanism.

B2.1 The method of paragraph B2, wherein the pressurizing includes utilizing a source of pressurized gas, wherein the source of pressurized gas is outside of the launch vehicle and does not launch with the launch vehicle.

B2.2 The method of paragraph B2, further comprising:
after the restricting, launching the launch vehicle; and
after the launching, demating (or disengaging) the second spacecraft from the first spacecraft.

B2.2.1 The method of paragraph B2.2, wherein the demating includes repressurizing the pneumatic coupling mechanism.

B2.2.2 The method of paragraph B2.2, wherein the demating does not include repressurizing the pneumatic coupling mechanism and optionally includes utilizing pyrotechnics.

B2.3 The method of any of paragraphs B2-B2.2.2, wherein the method utilizes the system of paragraph A6.

B3. The method of any of paragraphs B-B1.1, wherein the mating includes pressurizing a hydraulic coupling mechanism and the restricting includes depressurizing the hydraulic coupling mechanism.

B3.1 The method of paragraph B3, wherein the pressurizing includes utilizing a source of hydraulic pressure, wherein the source of hydraulic pressure is outside of the launch vehicle and does not launch with the launch vehicle.

B3.2 The method of paragraph B3, further comprising:

after the restricting, launching the launch vehicle; and after the launching, demating (or disengaging) the second spacecraft from the first spacecraft, wherein the demating includes repressurizing the hydraulic coupling mechanism.

B3.3 The method of any of paragraphs B3-B3.2, wherein the method utilizes the system of paragraph A7.

B4. The method of any of paragraphs B-B3.3, wherein the method utilizes the system of any of paragraphs A-A14.

B5. The method of any of paragraphs B-B4, wherein the method is performed by a coupling mechanism that has a coupled configuration and a decoupled configuration, wherein the mating includes transitioning the coupling mechanism from the coupled configuration to the uncoupled configuration and the restricting includes transitioning the coupling mechanism from the uncoupled configuration to the coupled configuration.

B5.1 The method of paragraph B5, wherein the transitioning the coupling mechanism from the decoupled configuration to the uncoupled configuration utilizes a different motive force than the transitioning the coupling mechanism from uncoupled configuration to the coupled configuration.

B5.2 The method of paragraph B5, wherein the transitioning the coupling mechanism from the coupled configuration to the uncoupled configuration utilizes pneumatic or hydraulic pressure, and wherein the transitioning the coupling mechanism from the uncoupled configuration to the coupled configuration utilizes spring force.

B5.3 The method of any of paragraphs B5-B5.2, wherein the coupling mechanism is not electrically powered.

B5.4 The method of any of paragraphs B5-B5.3, wherein the coupling mechanism is free of one or more motors, gears, and electrical actuators.

B6. The method of any of paragraphs B-B5.4, wherein the mating and the restricting do not utilize one or more of motors, gears, and electrical actuators.

C. A system for interconnecting dual manifested spacecraft for launch by a launch vehicle, the system comprising:

coupling means for selectively and securely coupling a first spacecraft to a second spacecraft; and triggering means for reconfiguring the coupling means from a coupled configuration to an uncoupled configuration to permit mating of the second spacecraft to the first spacecraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A system for interconnecting a first spacecraft and a second spacecraft for launch by a launch vehicle, the system comprising:

coupling means for selectively and securely coupling the first spacecraft to the second spacecraft;

a volume of pressurized fluid for reconfiguring the coupling means from a coupled configuration to an uncoupled configuration to permit mating of the second spacecraft to the first spacecraft; and demating means, separate from the coupling means and the volume of pressurized fluid, for demating of the first spacecraft and the second spacecraft after launch of the launch vehicle and once the first spacecraft and the second spacecraft are in orbit;

wherein the volume of pressurized fluid provides a first motive force for reconfiguring the coupling means from the coupled configuration to the uncoupled configuration;

wherein the coupling means utilizes a second motive force for coupling the first spacecraft to the second spacecraft;

wherein the second motive force is a different kind of motive force from the first motive force; and wherein the volume of pressurized fluid exclusively is ground-based and does not launch with the launch vehicle.

2. The system of claim 1 in combination with the first spacecraft, the second spacecraft, and the launch vehicle, wherein the second spacecraft is mated with the first spacecraft by the system, and wherein the first spacecraft and the second spacecraft are housed in the launch vehicle.

3. The system of claim 1, wherein the first motive force includes pneumatic pressure or hydraulic pressure; and wherein the second motive force includes spring force.

4. The system of claim 1, wherein the coupling means includes:

a plurality of pins configured to permit mating of the first spacecraft and the second spacecraft when the coupling means is in the uncoupled configuration and to restrict demating of the first spacecraft and the second spacecraft when the coupling means is in the coupled configuration; and a plurality of springs associated with the plurality of pins, wherein the plurality of springs provides the second motive force, which biases the plurality of pins to bias the coupling means to the coupled configuration; and wherein the volume of pressurized fluid is configured to provide the first motive force to selectively translate the plurality of pins responsive to an increase in pneumatic pressure operative on the plurality of pins and against a bias of the plurality of springs to reconfigure the coupling means from the coupled configuration to the uncoupled configuration thereby permitting mating of the first spacecraft and the second spacecraft, and to selectively permit translation of the plurality of pins under the bias of the plurality of springs responsive to a decrease in pneumatic pressure to reconfigure the coupling means from the uncoupled configuration to the coupled configuration thereby restricting demating of the first spacecraft and the second spacecraft.

5. The system of claim 4, wherein the volume of pressurized fluid is a volume of pressurized gas configured to selectively pressurize the coupling means to reconfigure the coupling means from the coupled configuration to the uncoupled configuration against the bias of the plurality of pins.

6. The system of claim 1, wherein the coupling means is free of motors and gears.

7. The system of claim 1, wherein the coupling means is not electrically powered.

8. A system for interconnecting a first spacecraft and a second spacecraft for launch by a launch vehicle, the system comprising:

a coupling mechanism configured to selectively and securely couple the first spacecraft to the second spacecraft, wherein the coupling mechanism has an uncoupled configuration, in which the coupling mechanism is configured to permit the second spacecraft to become mated with the first spacecraft, and a coupled configuration, in which the coupling mechanism is configured to restrict the second spacecraft from being demated from the first spacecraft, wherein the coupling mechanism is biased to the coupled configuration, wherein the coupling mechanism utilizes a single first motive force for transitioning from the coupled configuration to the uncoupled configuration and a plurality of individual second motive forces for transitioning from the uncoupled configuration to the coupled configuration, and wherein the first motive force is a different kind of motive force than the second motive forces;

a volume of pressurized fluid configured to apply the first motive force to the coupling mechanism to selectively reconfigure the coupling mechanism from the coupled configuration to the uncoupled configuration to permit mating of the second spacecraft to the first spacecraft, and wherein the volume of pressurized fluid exclusively is ground-based and does not launch with the launch vehicle; and a demating mechanism, separate from the coupling mechanism and the volume of pressurized fluid and configured to facilitate demating of the first spacecraft and the second spacecraft after launch of the launch vehicle and once the first spacecraft and the second spacecraft are in orbit.

9. The system of claim 8 in combination with the first spacecraft, the second spacecraft, and the launch vehicle, wherein the second spacecraft is mated with the first spacecraft by the system, and wherein the first spacecraft and the second spacecraft are housed in the launch vehicle.

10. The system of claim 8,
wherein the first motive force includes pneumatic pressure or hydraulic pressure; and
wherein the second motive forces include spring forces.

11. The system of claim 8,
wherein the coupling mechanism includes:
a plurality of pins configured to permit mating of the first spacecraft and the second spacecraft when the coupling mechanism is in the uncoupled configuration and to restrict demating of the first spacecraft and the second spacecraft when the coupling mechanism is in the coupled configuration; and a plurality of springs associated with the plurality of pins, wherein the plurality of springs provides the second motive forces, which bias the plurality of pins to bias the coupling mechanism to the coupled configuration; and wherein the volume of pressurized fluid is configured to provide the first motive force to selectively translate the plurality of pins responsive to an increase in pneumatic pressure operative on the plurality of pins and against a bias of the plurality of springs to reconfigure the coupling mechanism from the coupled configuration to the uncoupled configuration thereby permitting mating of the first spacecraft and the second spacecraft, and to selectively permit translation of the plurality of pins under the bias of the plurality of springs responsive to a decrease in pneumatic pressure to reconfigure the coupling mechanism from the uncoupled configuration to the coupled configuration thereby restricting demating of the first spacecraft and the second spacecraft.

12. The system of claim 11, wherein the volume of pressurized fluid is a volume of pressurized gas configured to selectively pressurize the coupling mechanism to reconfigure the coupling mechanism from the coupled configuration to the uncoupled configuration against the bias of the plurality of pins.

13. A method for interconnecting a first spacecraft and a second spacecraft for launch in a launch vehicle, the method comprising:

utilizing a ground-based pneumatic pressure to retract a plurality of pins to permit mating of the first spacecraft to the second spacecraft, wherein a source of the ground-based pneumatic pressure comprises a volume of pressurized gas that exclusively is ground-based and does not launch with the launch vehicle;

following the utilizing, mating the first spacecraft to the second spacecraft; and after the mating, utilizing spring force to extend the plurality of pins to restrict demating of the second spacecraft from the first spacecraft;

wherein at least one of the first spacecraft and the second spacecraft comprises a demating mechanism for facilitating demating of the first spacecraft and the second spacecraft after launch of the launch vehicle and once the first spacecraft and the second spacecraft are in orbit, and wherein the demating mechanism utilizes neither the pneumatic pressure nor the spring force.

14. The system of claim 1, wherein the demating means comprises a pyrotechnic system.

15. The system of claim 8, wherein the demating mechanism comprises a pyrotechnic system.

16. The method of claim 13, wherein the demating mechanism comprises a pyrotechnic system.

\* \* \* \* \*